A. FROMLET.
Culinary-Vessels.
No. 157,747.
Patented Dec. 15, 1874.
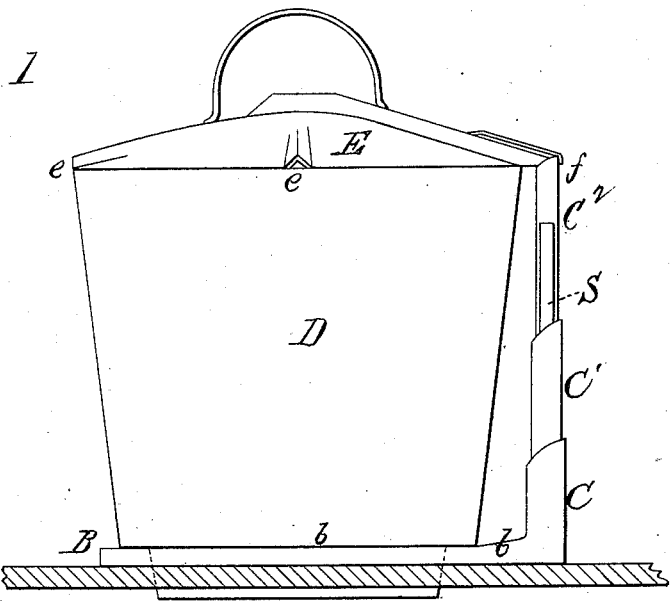
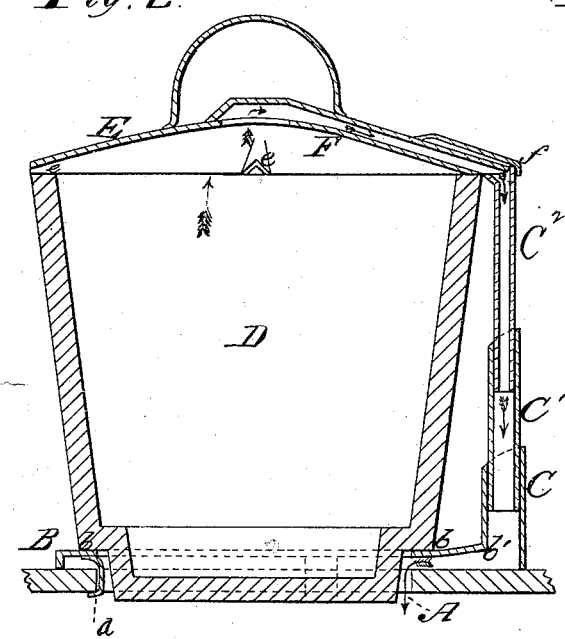
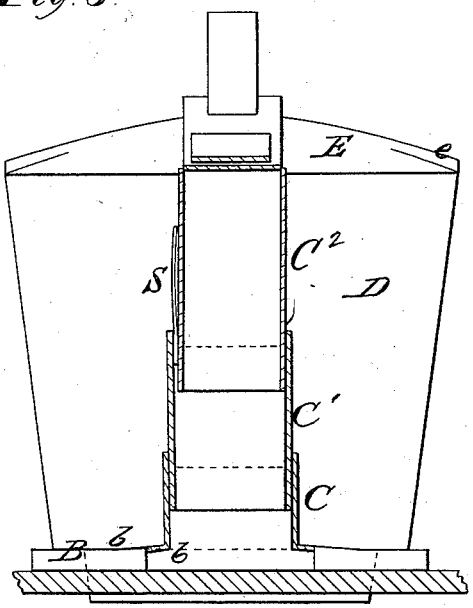
WITNESSES
Mary J. Utley.
E. H. Bates
INVENTOR
Aloys Fromlet,
BY Chipman Hosmer & Co
ATTORNEYS

UNITED STATES PATENT OFFICE.

ALOYS FROMLET, OF RANTOUL, ILLINOIS.

IMPROVEMENT IN CULINARY VESSELS.

Specification forming part of Letters Patent No. 157,747, dated December 15, 1874; application filed May 16, 1874.

*To all whom it may concern:*

Be it known that I, ALOYS FROMLET, of Rantoul, in the county of Champaign and State of Illinois, have invented a new and valuable Improvement in Attachments for Cook-Stoves; and I do hereby declare that the following is a full, clear, and exact description of the construction and operation of the same, reference being had to the annexed drawings making a part of this specification, and to the letters and figures of reference marked thereon.

Figure 1 of the drawing is a representation of a side view of my cook-stove attachment, and Fig. 2 is a sectional view. Fig. 3 is a detailed sectional view.

This invention has relation to means whereby odors and steam arising from cooking are conducted into the flue of a stove; and it consists in a hollow stove-support, from which rises a tube to enter a pot or other similar vessel at or near its highest point, by which disagreeable vapors, steam, and smells are conducted into a stove, and are either decomposed or pass up the flue, all as will be hereinafter more fully explained.

In the annexed drawings, A designates a pot-hole of a stove, to which is applied a hollow base-support, B, for a pot or vessel, which base-support may be secured upon the pot-hole by means of hooks $a$, or may be cast with the upper stove-plate.

In practice I prefer to have the hollow of the base-support B extend all around the pot-hole; but I may have it extend only partly around. Upon this base-support and through a perforation in the upper surface thereof rises a tube composed of sections C $C^1$ $C^2$, or only of one piece. By means of these sections I am enabled to regulate the height of this tubular attachment to suit the height of any pot or vessel, and I shall, in practice, use this device in connection with stoves and ranges, or other furnaces where the pots are removably applied; but for soap-boilers or other like stationary vessels I prefer to use the single section.

When using a sectional attachment I apply a spring, S, as shown in Fig. 3, to prevent the sections from telescoping, or sliding the one within the other.

D is a pot having a lid, E, with bent portions $e\ e$ in the circumference thereof, for the purpose of admitting air into the pot. Upon the upper surface of the lid E I construct a tubular duct, F, applied to said lid in a perforation in the highest part thereof, and it is provided at its outer extremity with a hook, $f$, which, when placed over the upper end of section $C^2$, serves to hold the duct F and section $C^2$ in close union, thus preventing the escape of any odors or steam into the room while on their way down the tubes into the base-support.

Instead of making a connection with the interior of a pot by means of duct F upon the upper surface of the lid E, I may make a connection directly with the pot or vessel at or near its highest portion by means of a perforation therein, and a shoulder or collar applied around said perforation to receive the end of section $C^2$.

It will be seen that I have invented a pot support in part or wholly hollow, which may be applied by means of hooks to any stove pot-hole, and that, by means of a sectional tubular device rising therefrom, I am enabled to conduct gases and odors arising from cooking out of a pot or vessel, either directly from the vessel itself or from a perforation in the lid thereof into the body of a stove or range where they are consumed, decomposed, or are carried through the flue into the air.

I am well aware that a sectional duct rigidly secured to a culinary vessel and connected thereto for the purpose of conveying the steam and odors arising from cooking from the interior of the said vessel to the fire-chamber of a stove is not new, hence I make no broad claim to such a device.

What I claim as new, and desire to secure by Letters Patent, is—

The detachable hollow base-support B, provided with the hooks $a\ a$, and sectional adjustable tubular ducts C $C^1$ $C^2$, and spring S for holding the sections in any required position, in combination with the lid E, having the duct F and hook $f$, substantially as described, and for the purpose set forth.

In testimony that I claim the above I have hereunto subscribed my name in the presence of two witnesses.

ALOYS FROMLET.

Witnesses:
 ABRM. CROSS,
 JAS. W. GRAY.